US011412765B2

(12) United States Patent
Popplewell et al.

(10) Patent No.: US 11,412,765 B2
(45) Date of Patent: *Aug. 16, 2022

(54) SPRAY-DRIED COMPOSITIONS CAPABLE OF RETAINING VOLATILE COMPOUNDS AND METHODS OF PRODUCING THE SAME

(71) Applicant: International Flavors and Fragrances Inc., New York, NY (US)

(72) Inventors: Lewis Michael Popplewell, Morganville, NJ (US); Keith Thomas Hans, Princeton, NJ (US); Lulu Henson, Plainsboro, NJ (US); Christopher Thomas Lavallee, Morganville, NJ (US); Eric Jesse Wolff, Chalfont, PA (US); Maria Wright, Princeton, NJ (US)

(73) Assignee: International Flavors and Fragrances Inc., New York, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 15/722,465

(22) Filed: Oct. 2, 2017

(65) Prior Publication Data

US 2018/0027855 A1 Feb. 1, 2018

Related U.S. Application Data

(63) Continuation of application No. 14/834,726, filed on Aug. 25, 2015, now abandoned, which is a continuation of application No. 14/002,257, filed as application No. PCT/US2012/027435 on Mar. 2, 2012, now abandoned.

(60) Provisional application No. 61/449,440, filed on Mar. 4, 2011.

(51) Int. Cl.
| | |
|---|---|
| *A23L 27/20* | (2016.01) |
| *A23L 5/00* | (2016.01) |
| *A23L 27/00* | (2016.01) |
| *A23L 27/12* | (2016.01) |
| *A23G 4/06* | (2006.01) |
| *A23L 2/56* | (2006.01) |

(52) U.S. Cl.
CPC ............. *A23L 27/20* (2016.08); *A23G 4/06* (2013.01); *A23L 2/56* (2013.01); *A23L 5/51* (2016.08); *A23L 27/12* (2016.08); *A23L 27/202* (2016.08); *A23L 27/2022* (2016.08); *A23L 27/70* (2016.08); *A23V 2002/00* (2013.01)

(58) Field of Classification Search
CPC . A23L 27/20; A23L 5/51; A23L 27/70; A23L 2/56; A23L 27/12; A23L 27/202; A23L 27/2022; A23G 4/06
See application file for complete search history.

(56) References Cited

U.S. PATENT DOCUMENTS

| | | | |
|---|---|---|---|
| 3,554,768 A | 1/1971 | Feldman | 426/534 |
| 3,655,397 A | 4/1972 | Parliment et al. | 426/534 |
| 3,679,416 A | 7/1972 | Reich et al. | 426/453 |
| 3,741,273 A | 6/1973 | Meade | 159/4.01 |
| 3,886,297 A | 5/1975 | Parliment et al. | 426/573 |
| 3,962,321 A | 6/1976 | Parliment et al. | 426/535 |
| 4,093,750 A | 6/1978 | Babayan | 426/250 |
| 4,276,312 A | 6/1981 | Merritt | 426/96 |
| 4,448,489 A | 5/1984 | Yang | 426/5 |
| 4,448,789 A | 5/1984 | Yang | 426/5 |
| 4,532,145 A | 7/1985 | Saleeb et al. | 426/650 |
| 5,124,162 A | 6/1992 | Boskovic et al. | 426/96 |
| 5,443,829 A | 8/1995 | Kensil et al. | 424/765 |
| 5,851,578 A | 12/1998 | Gandhi | 426/590 |
| 6,387,431 B1 | 5/2002 | Gautschi | 426/534 |
| 6,482,433 B1 | 11/2002 | DeRoos et al. | 424/464 |
| 2002/0187221 A1 | 12/2002 | Tanaka et al. | 426/89 |
| 2004/0086619 A1 | 5/2004 | Zhong et al. | 426/592 |
| 2005/0031769 A1 | 2/2005 | Watanabe et al. | 426/640 |
| 2006/0159818 A1 | 7/2006 | Kunieda | 426/534 |
| 2008/0063747 A1 | 3/2008 | Boghani et al. | 426/5 |
| 2009/0197973 A1 | 8/2009 | Arakawa et al. | 514/772 |
| 2011/0059205 A1 | 3/2011 | Gaysinsky et al. | 426/66 |
| 2011/0064783 A1 | 3/2011 | Bang-Madsen et al. | 424/440 |
| 2013/0022728 A1 | 1/2013 | Popplewell et al. | 426/535 |
| 2014/0193562 A1 | 7/2014 | Popplewell et al. | 426/535 |

FOREIGN PATENT DOCUMENTS

| | | |
|---|---|---|
| DE | 1 667 205 | 7/1970 |
| EP | 0155848 A2 | 9/1985 |
| EP | 1477073 A1 | 11/2004 |
| WO | 2008039564 | 4/2008 |
| WO | WO 2011/121468 A1 | 10/2011 |
| WO | WO 2012/122010 A2 | 9/2012 |

OTHER PUBLICATIONS

Hills, S. "New Emulsifier an Alternative to Gum Arabic" Jul. 8, 2008 FoodNavigator-USA.com.
Maruzen Corporation, *Handbook of Chemistry and Engineering*, 1999 pp. 770 and 780.
Rigano et al. "Quillaja Triterpenic Saponins Can Act as a Natural Emulsifier and Dispersing Agent to Offer a Real Alternative to Synthetic Surfactants" Soap, Perfumery, & Cosmetics 2009 82(11):2-4.
Thijssen, H.A.C. and Rulkens, W.H. "Retention of Aromas in Drying Food Liquids" De Ingenieur 1968 80(47):45-56.
Trans-2-Nonenal 97% Safety Data Sheet, Pfaltz & Bauer Rare and Fine Chemicals, Product Code N13740, prepared Jul. 10, 2013.
Office Communication dated May 6, 2014 from U.S. Appl. No. 13/625,354, filed Sep. 24, 2012.
Office Communication dated Dec. 15, 2014 from U.S. Appl. No. 13/625,354, filed Sep. 24, 2012.
Office Communication dated Oct. 27, 2014 from U.S. Appl. No. 14/002,257, filed Feb. 18, 2014.
Office Communication dated Feb. 25, 2015 from U.S. Appl. No. 14/002,257, filed Feb. 18, 2014.

(Continued)

*Primary Examiner* — Nikki H. Dees

(57) ABSTRACT

The present invention relates to spray-dried compositions capable of retaining volatile compounds and methods relating to the same. The present invention also relates to the powders produced by such methods.

13 Claims, 3 Drawing Sheets

(56) References Cited

OTHER PUBLICATIONS

International Search Report from PCT/US2012/027435, dated Jun. 7, 2012, PCT.
International Preliminary Report on Patentability from PCT/US2012/027435, dated Feb. 4, 2014, PCT.
International Search Report from PCT/US2013/060290, dated Feb. 3, 2014, PCT.
European Search Report from Application No. 15159106.2, dated Jun. 22, 2015, EP.
Reineccius, G.A. "The Spray Drying of Food Flavors" Drying Technology, Taylor & Francis, Philadeliphia PA, US, Jun. 1, 2004 22(6):1289-1324, XP001200326.
Suntaree et al. "Effect of Maltodextrin and Inlet Air Temperatures on Quality of Spray Dried Pandan Extract" Internet Citation Jul. 17, 2003 p. 1, XP002635052.
Thijssen, H.A.C. "Prevention of Aroma Losses During Drying of Liquid Foods" Dechema-Monographien Oct. 25, 1971 70(25):353-366, XP009185826.
Extended European Search Report from Application No. 12754631.5, dated Aug. 27, 2015, EP.
Meade, R.E. "Novel Dual Dryer" Food Engineering 1971 43(7):88-89 XP009190951.
Office Communication dated Apr. 26, 2016 from U.S. Appl. No. 13/625,354, filed Sep. 24, 2012.
Office Communication dated Apr. 26, 2016 from U.S. Appl. No. 14/208,463, filed Mar. 13, 2014.
Communication pursuant to Article 94(3) EPC for EP Application No. 12754631.5, dated Jul. 21, 2016, EP.
Office Communication dated Sep. 6, 2016 from U.S. Appl. No. 13/625,354, filed Sep. 24, 2012.
Office Communication dated Oct. 12, 2016 from U.S. Appl. No. 14/208,463, filed Mar. 13, 2014.
Office Communication dated May 4, 2016 from U.S. Appl. No. 14/834,726, filed Aug. 25, 2015.
Office Communication dated Sep. 29, 2016 from U.S. Appl. No. 14/834,726, filed Aug. 25, 2015.
Office Communication dated Nov. 30, 2017 from U.S. Appl. No. 14/834,726, filed Aug. 25, 2015.
Office Communication dated Jan. 18, 2017 from U.S. Appl. No. 13/625,354, filed Sep. 24, 2012.
Office Communication dated Nov. 28, 2017 from U.S. Appl. No. 13/625,354, filed Sep. 24, 2012.
Office Communication dated Feb. 22, 2017 from U.S. Appl. No. 14/208,463, filed Mar. 13, 2014.
Office Communication dated Jul. 17, 2017 from U.S. Appl. No. 14/208,463, filed Mar. 13, 2014.
Office Communication dated Nov. 14, 2017 from U.S. Appl. No. 14/208,463, filed Mar. 13, 2014.

** SIGNIFICANTLY DIFFERENT AT P = 0.05 AT THESE ELAPSED TIMES

** SIGNIFICANTLY DIFFERENT AT P=0.05 AT THESE ELAPSED TIMES

SPRAY-DRIED COMPOSITIONS CAPABLE OF RETAINING VOLATILE COMPOUNDS AND METHODS OF PRODUCING THE SAME

INTRODUCTION

This patent application is a continuation of U.S. application Ser. No. 14/834,726 filed Aug. 25, 2015 which is a continuation of U.S. application Ser. No. 14/002,257 filed Feb. 18, 2014, now abandoned, which is the National Stage of International Application No. PCT/US2012/027435 filed Mar. 2, 2012, which claims the benefit of priority from U.S. Provisional Application Ser. No. 61/449,440, filed Mar. 4, 2011, the contents of which are herein incorporated by reference in their entirety.

BACKGROUND OF THE INVENTION

In the food industry, spray drying, freeze-drying, vacuum continuous belt drying, and reduced pressure-low temperature drying with a vacuum dryer have been used to produce dry powders of flavor ingredients such as, for example, dry extracts of animals and plants.

Spray drying is a common industrial method for drying liquid solutions or slurries by spraying into a stream of hot gas. It is a rapid, one-step process for converting the feed liquid into a powder. Usually the drying gas is air, but nitrogen can also be used for special products needing oxygen-free conditions. The most common feed materials are aqueous-based solutions, emulsions and suspensions, where water is evaporated in the dryer. The liquid feed is fed to an atomizer, which is a device that breaks up the liquid stream into tiny droplets. This atomization takes place within the drying chamber so that the droplets are immediately exposed to hot air that initiates rapid moisture evaporation. The droplets become small particles of powder as the moisture is evaporated and they fall to the bottom of the drying chamber. Pressure nozzles, rotary disks, two-fluid nozzles, and the like are used as the atomizing unit. In many cases, the mean particle size (diameter) of the resulting dry powder is about 20 µm to 500 µm, and the drying time is as short as 5 to 30 seconds (see, Handbook of Chemistry and Engineering (1999) revised sixth edition, Maruzen Corporation, p. 770, p. 780). A four-fluid nozzle has also been developed, which has enabled mass-scale spray drying with a liquid droplet having a mean particle size of several micrometers.

The spray drying method is used in many cases of mass scale production. In general, to produce a large volume of powder in a short period of time, a solution or slurry is fed at a fast feed rate into a spray dryer, while the inlet temperature of the spray dryer and the outlet temperature thereof are elevated as high as possible, to dry the slurry at a high speed. For example, milk is dried at an inlet temperature of the spray dryer of 150 to 250° C. and yeast is dried at the inlet temperature of 300 to 350° C. Drying at such high temperatures may negatively impact the flavor of the raw material itself and produce a dry powder with a burned odor. However, spray drying at a low temperature to avoid these disadvantages can increase process times and costs. See US 2005/0031769 and U.S. Pat. No. 6,482,433.

Spray-dried encapsulated flavors are created during the drying process when the aqueous carrier slurry forms a shell around the normally oil-based flavor core. During the drying process, a thin film of carrier material rapidly forms around the atomized droplet and selectively allows water to evaporate while retaining the flavor oil (Thijssen & Rulkens (1968) De Ingenieur 80:45-56). The shell protects the core against deterioration and volatile evaporation, but also allows the core to be released under desired conditions, for example, dissolution in water.

There has been a long felt need to spray dry natural and synthetic materials to provide intense fresh, authentic consumer preferred flavors in foodstuffs and other flavor-containing products. Likewise, there is a similar need to spray dry natural and synthetic materials to provide intense, fresh, authentic consumer preferred fragrances in consumer products.

SUMMARY OF THE INVENTION

The present invention is a spray-dried flavor composition containing a spray-dried flavor that has volatile compounds, wherein the volatile compounds are present in an amount that is at least 20% of the volatile compounds originally contained in the flavor.

The invention also provides a spray-dried flavor composition produced by spray drying a flavor that contains volatile compounds in a spray dryer having an inlet temperature of less than 100° C. and an air inlet dew point −10° C. to 5° C., wherein the volatile compounds are present in the spray-dried flavor composition in an amount that is at least 20% of the volatile compounds originally contained in the flavor.

The invention also provides a stable spray-dried flavor composition produced by spray drying a flavor that that contains volatile compounds in a spray dryer having an inlet temperature of less than 100° C. and an air inlet dew point −10° C. to 5° C., wherein the volatile compounds are present in the spray-dried flavor composition in an amount that is at least 20% of the volatile compounds originally contained in the flavor.

A method for producing a spray-dried composition capable of retaining volatile compounds is also embraced by the present invention. In accordance with this method, a flavor containing volatile compounds is spray dried in a spray dryer having an inlet temperature of less than 100° C. and an air inlet dew point −10° C. to 5° C. to obtain a spray-dried flavor composition, wherein the volatile compounds are present in the spray-dried flavor composition in an amount that is at least 20% of the volatile compounds originally contained in the flavor.

In accordance with certain embodiments of the composition and methods of this invention, the spray-dried composition may be subjected to an additional drying step in a fluid-bed chamber attached at the spray dryer outlet, wherein the temperature of the air of the fluid-bed unit is at or below the outlet temperature of the spray dryer. In other embodiments, the volatile compounds are acetaldehydes, dimethyl sulfides, ethyl acetates, ethyl propionates, methyl butyrates, or ethyl butyrates. In yet other embodiments, the volatile compounds have a boiling point of less than 200° C., less than 100° C., or less than 60° C.

In further embodiments, the composition fed to the dryer may further include a carrier material and/or a solvent, such as a volatile solvent, wherein the flavor and carrier comprise 40% and 70% as dry solid material of the total composition. For the purpose of the invention, a dry solid material is defined as a combination of carrier and flavor materials. In yet other embodiments, the flavor is prepared as an emulsion and the volatile compounds are present in the emulsion in an amount that is at least 80% of the volatile compounds originally contained in the flavor. Still further embodiments include the use of nitrogen or carbon dioxide in the spray dryer. In certain embodiments, the air inlet temperature is in the range of 40° C. to 99° C. Flavor compositions with a water activity in the range of 0.1 to 0.6 and high intensity flavor compositions and their use in, e.g., a chewing gum or beverage are also provided.

DETAILED DESCRIPTION OF THE INVENTION

Figure 1:
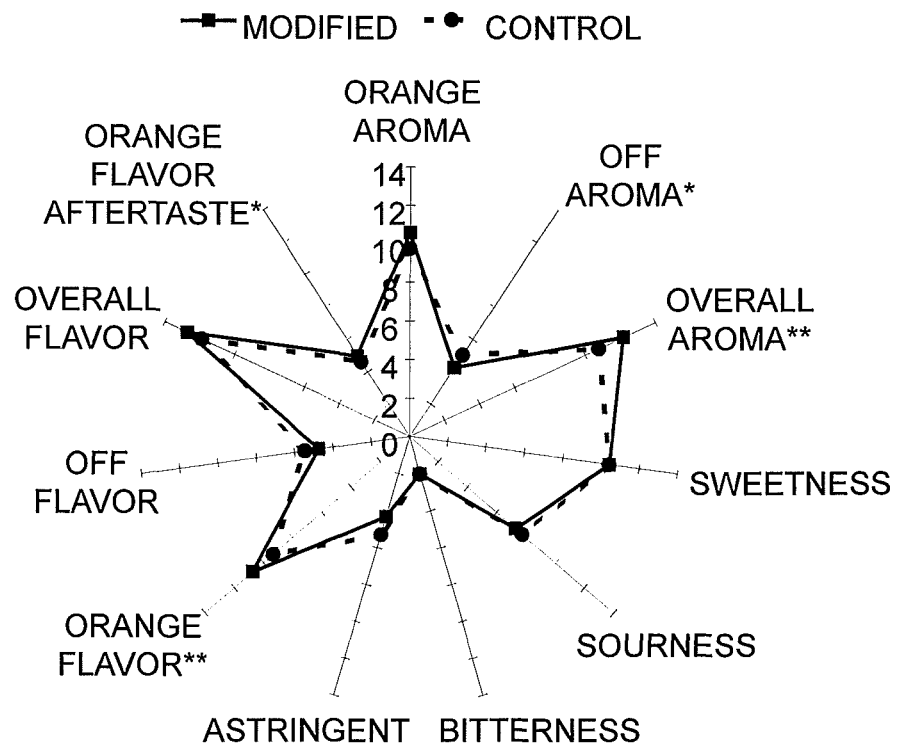
FIG. 1 shows a comparison of sensory profiles of Orange Flavor between samples produced under different RH/Temperature conditions in a beverage tasting solution. *Directionally different, **Significantly different at p=0.05

It has been found that commercially available spray dryer nozzles, geometries, and circulation patterns can be used in methods of producing powders with high volatile retention and high flavor intensity, even when drying for an extended amount of time. In particular, when a conventional spray dryer is used with an inlet temperature of less than 100° C. and a dew point −10° C. to 5° C., higher levels of volatile compounds can be retained. Because of the increased efficiency of the method described herein, drying of flavor compositions containing volatile compounds can be achieved at relatively low temperatures compared to conventionally used methods. The resulting spray-dried flavor composition has high intensity flavor and has a high flavor/fragrance quality that is authentic to the natural source. Surprisingly, these flavor compositions maintain high flavor intensity and flavor/fragrance quality in various end-use applications after long-term storage.

The invention also provides a stable spray-dried flavor composition produced by spray drying a flavor that that contains volatile compounds in a spray dryer having an inlet temperature of less than 100° C. and an air inlet dew point −10° C. to 5° C., wherein the volatile compounds are present in the spray-dried flavor composition in an amount that is at least 20% of the volatile compounds originally contained in the flavor. For the purpose of this invention stability is defined as a flavor quality and intensity that remains acceptable for use in end use applications. Preferably, a stable spray-dried flavor composition has a shelf-life of up to three years depending on storage conditions. Consumer data, as demonstrated in the examples herein, showed statistically significant preference for the flavors composition of the present invention. The consumer preferred quality of the flavor composition is further supported by the attributes selected by consumers to describe the flavor quality of the prototypes.

Therefore, the present invention is a spray-dried flavor composition and a method for producing such a composition. In accordance with the present invention, a spray-dried flavor composition containing one or more volatile compounds is produced by spray drying a flavor in a spray dryer with an inlet temperature of less than 100° C. and a dew point −10° C. to 5° C. so that a dry powder is obtained. In certain embodiments, the resulting spray-dried composition is further dried in a fluidized bed. As a result of the instant method, the spray-dried flavor composition retains at least 20% of the volatile compounds originally contained in the flavor.

Unless otherwise specified, a flavor of the invention is a flavor that contains one or more volatile compounds. A variety of flavors can be used in accordance with the present invention. Flavor may be chosen from synthetic flavor and flavoring aromatics, and/or oils, oleo resins and oil extracts derived from plants, leaves, flowers, fruits, and combinations thereof. Representative flavor oils include, but are not limited to, spearmint oil, cinnamon oil, peppermint oil, clove oil, bay oil, thyme oil, cedar leaf oil, oil of nutmeg, oil of sage, and oil of bitter almonds. Also useful are artificial, natural or synthetic fruit flavors such as vanilla, chocolate, coffee, cocoa and citrus oil, including lemon, orange, grape, lime and grapefruit, and fruit essences including apple, pear, peach, strawberry, raspberry, cherry, plum, pineapple, apricot and so forth. These flavors can be used individually or in admixture.

The volatile compounds of the instant flavor may include, but are not limited to, acetaldehyde, dimethyl sulfide, ethyl acetate, ethyl propionate, methyl butyrate, and ethyl butyrate. Flavors containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in the instant flavor oils include acetaldehyde (apple); benzaldehyde (cherry, almond); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof. The composition may also contain taste modulators and artificial sweeteners.

The physical, chemical, and odor properties of selected volatile compounds are presented in Table 1.

TABLE 1

| Compound | MW (g/mol) | Boiling Point (° C.) | Water Solubility (g/L, approx.) | Odor Descriptors* |
| --- | --- | --- | --- | --- |
| acetaldehyde | 44.05 | 21 | soluble | pungent; ethereal |
| dimethyl sulfide | 62.02 | 36 | insoluble | cabbage |

TABLE 1-continued

| Compound | MW (g/mol) | Boiling Point (° C.) | Water Solubility (g/L, approx.) | Odor Descriptors* |
|---|---|---|---|---|
| ethyl acetate | 88.11 | 77 | 90 | ethereal; fruity |
| ethyl propionate | 102.13 | 99 | 14 | sweet; fruity; ethereal |
| methyl butyrate | 102.13 | 102 | 15 | fruity; pineapple |
| ethyl butyrate | 116.16 | 121 | 6 | fruity; pineapple |

*The Good Scents Company and Merck Index, 12$^{th}$ Ed.

The instant invention is particularly useful in processing flavors with volatile compounds having a boiling point of less than 200° C., less than 150° C., less than 120° C., less than 100° C., less than 80° C., less than 60° C., less than 40° C., less than 20° C., or less than 0° C. Using such flavors, higher levels of volatile compounds are retained, which results in a sensory perceivable difference over conventional drying processes.

In certain embodiments, the invention further includes the use of a carrier material to enhance processing productivity and flavor intensity. Such carriers can include any sugar, sugar derivatives, modified starch, proteins, celluloses, salts, dextrins, gums, sugar alcohols, polyols, peptides, acids, carbohydrates or hydrocolloids. Particular examples of suitable materials include sugars such as sucrose, glucose, lactose, levulose, trehalose, fructose, maltose, ribose, dextrose, isomalt, sorbitol, mannitol, xylitol, lactitol, maltitol, pentatol, arabinose, pentose, xylose, galactose; hydrogenated starch hydrolysates; maltodextrins or dextrins (soluble fiber); hydrocolloids such as agar or carrageenan; gums; polydextrose; proteins such as soy and whey protein isolates and hydrolyzates, and sodium caseinates; and derivatives and mixtures thereof. The carrier can be selected based upon, amongst other factors, the desired flavor, authentic taste and intensity to be achieved.

In some embodiments, the flavor and optional carrier material are dissolved or emulsified in a solvent and subsequently spray-dried. In some embodiments, the solvent is water. In other embodiments, the solvent is not water. In yet further embodiments, the solvent is a volatile solvent. In still other embodiments, the solvent is a mixture of water and a volatile solvent. As is known in the art, a volatile solvent is a nonaqueous liquid with solvent properties with the characteristic of evaporating readily at room temperature and atmospheric pressure. Volatile solvents of particular use in accordance with the present invention include, but are not limited to, ethanol, ethyl acetate, acetone.

Flavor emulsions can be prepared according to standard preparation procedures. Briefly, the practice involves dispersing and dissolving the dry carrier materials in solvent until free of lumps. When using water as the solvent, it may be desirable to warm the water (e.g., to approximately 50° C.) prior to adding the carrier material. The flavor is then added under constant agitation until a homogeneous mixture is obtained. The emulsion may be further subjected to high shear or homogenized to reduce oil droplet size prior to spray drying.

In certain embodiments, the emulsion contains between 40% and 70% dry solid material (including the flavor), or more preferably between 55% and 65% dry solid material (including the flavor). The amount of dry solid material can be adjusted by using more or less water depending on the solubility of the carrier material and various factors related to efficient operation of the spray dryer. For example, the type and amount of carrier, amount of water, and/or amount of flavor can be adjusted so that the resulting emulsion has a viscosity suitable for feeding into a spray dryer to provide liquid droplets having a mean particle size (mean volume diameter) of between 10 μm and 200 μm. For example, when using spray nozzles, such as a three-fluid nozzle and a four-fluid nozzle, the viscosity of the feed slurry is preferably 500 cps or less, preferably 200 cps or less, and more preferably 80 cps or less. For a rotary atomizer (rotary disk), the viscosity is preferably 70,000 cps or less. Moreover, the feed slurry (i.e., emulsion) can be heated (e.g., to near the inlet temperature) or cooled (e.g., to 15° C.) immediately before adding it to the spray dryer to modify fluidity. In addition, certain flavors, especially those that are more water-soluble, act as plasticizers thereby making processing more difficult due to stickiness. In this respect, the ratios of carrier materials can be modified. Therefore, various factors can be appropriately selected or modified for use in combination with different spray dry apparatuses.

In addition to the flavor and carrier material, an emulsifier or surfactant can also be used in the production of the instant spray-dried flavor composition. Examples of suitable emulsifiers or surfactants include, but are not limited to, lecithins, sucrose esters, proteins, gums, soap-bark extract, saponins, and the like. Moreover, a variety of solvents can be used in the instant spray-dried flavor composition. Such solvents include, volatiles and nonvolatiles but are not limited to alcohol (e.g., ethanol), ethyl acetate, acetone, triglycerides, vegetable oils, animal fats, and triacetin.

Commercially available spray dryers can be used as in the practice of the present invention. For example, a spray dryer with a vertical parallel flow function can be used. The spray dryer should be a system with a dehumidifying and drying function. For example, a spray dryer capable of blowing a high volume of desiccated air with a dew point of less than 5° C. is particularly preferable. For a spray dryer with no dehumidifying and drying function, the spray dryer is inevitably arranged with a dry dehumidifier, e.g., a honeycomb-type rotary dehumidifier (e.g., Nichias Corporation or Sweden PROFLUTE Corporation). Suitable spray dryers include the micromist spray dryer and the hybrid granulator series manufactured by Fujisaki Electric Co., Ltd.; the fluidized spray dryer FSD with internal fluid bed as manufactured by Niro Corporation; the fluid granulation spray dryer and L-8 type spray dryer manufactured by Ogawara (Japan); the DL-21 type and GB-21 type spray dryers manufactured by Yamato Scientific Co., Ltd., and Anhydro Spray Bed Dryer manufactured by SPX Corporation.

In particular embodiments, the spray dryer is capable of generating liquid droplets (particles) having a mean particle size (mean volume diameter) of between about 10 μm to about 200 μm. Specifically, it is preferred to carry out spray drying with a spray dryer with a spray nozzle capable of generating a large volume of liquid droplets having a mean particle size of between about 10 μm to about 200 μm, preferably about 20 μm to about 150 μm, and more preferably about 30 μm to about 100 μm. When the liquid droplets are dried, a dry powder having a mean particle size (mean volume diameter) of about 10 μm to about 100 μm is preferred for retention of the flavor oil.

Among the operation conditions of the spray drying apparatus, in certain embodiments the outlet temperature of the spray drying apparatus is between 20° C. and 60° C., preferably 30 to 60° C., and more preferably 40 to 60° C. For the purposes of this invention, the outlet temperature of the spray dryer means the product temperature of the dry powder in the vicinity of the powder collection part of the spray dryer. For the spray dryer of the vertical parallel flow type, the outlet temperature means the temperature (exhaust gas temperature) at the exhaust part thereof.

In other embodiments of this invention, the average inlet air temperature of the spray drying apparatus is less than 100° C. In certain embodiments, the average inlet air temperature of the spray drying apparatus is in the range of 40° C. to 99° C., more preferably 60° C. to 99° C. and most preferably 80° C. to 99° C. For the purposes herein, the average inlet air temperature is a sum total of all inlet air streams, e.g., main chamber inlet air and the inlet air to the fluid bed(s).

As a particular feature of the instant invention, it is desirable that production parameters including temperature, pressure and humidity, are controlled to achieve an air inlet dew point in the range of −10° C. to 5° C. In particular embodiments, the air inlet dew point of the spray drying apparatus is 5° C. or less, preferably 0° C. or less, more preferably is −5° C. or less, and most preferably −7.5° C. or less. As is known in the art, dew point temperature is a function of air temperature and % RH and can be determined using a psychrometric chart or calculator. Dew point temperature is important as it corresponds directly to the actual amount of water in the air on a mass basis.

Once the spray-dried flavor composition is dried or partially dried in the spray drier, the resulting powder can be used in the production of food product, pharmaceuticals, consumer products and the like. Alternatively, particular embodiments feature the additional step of further drying the spray-dried flavor composition in a fluid-bed chamber attached at the outlet of the spray dryer. Accordingly, certain embodiments feature the use of an integrated fluid-bed spray dryer to produce the instant spray-dried flavor composition. This secondary drying can, e.g., further remove entrapped solvent, residual moisture, and/or water of molecular hydration, to provide a composition of powder particles with significantly lower moisture content that is stable in storage, e.g., for extended periods at ambient temperatures.

In accordance with this embodiment, the temperature of the air supplying the fluid-bed unit is maintained at or below the outlet temperature of the spray dryer in order to maintain the benefit of volatile flavor retention. Thus, the inlet temperature of the fluid-bed unit is between 40° C. and 99° C., preferably 50 to 95° C., and more preferably 60° C. to 90° C.; and the inlet dew point is in the range of −10 to 5° C.

In some embodiments, the fluid-bed has a single zone. In other embodiments, the fluid-bed unit has one, two, three or more zones, wherein each zone has a different temperature and air flow rate. In certain embodiments, the fluid-bed unit has three zones, each varying in temperature by at least 10° C. In particular embodiments, the fluid-bed unit has three zones, each varying in temperature by 10° C. to 20° C. By way of illustration, dry powder from a spray dryer with an outlet temperature of 60° C. could have a first fluid-bed zone at 60° C., a second bed zone of 45° C. and a third zone of 25° C.

Secondary drying can continue, e.g., for about 5 minutes to about 5 hours, or about 10 minutes to about 1 hour, and most preferably about 20 to 40 minutes until residual moisture is reduced to a desired level. In particular embodiments, secondary drying continues until the residual moisture of the powder particles is below 5 percent.

As used herein, "dry," "dried," and "substantially dried" encompass those compositions with from about 0% to about 15% water. Preferably, the instant composition will have a water activity of 0.1 to 0.6, or more desirably 0.2 to 0.5, and most preferably from 0.2 to 0.4 wherein said levels of dryness can be achieved with or without secondary drying.

Drying can also occur in the total or partial absence of ambient air. In this respect, drying can occur in the presence of $CO_2$ or other drying gases (e.g., nitrogen). Accordingly, in particular embodiments, the air of the spray dryer is partially or wholly composed of carbon dioxide or nitrogen. In accordance with this embodiment, partial carbon dioxide or nitrogen is intended to mean a level in the range of 80-99% carbon dioxide and/or nitrogen.

Once the spray-dried flavor composition reaches the desired level of dryness, it can be used in a variety of consumer, food, or pharmaceutical products. In particular, the instant spray-dried flavor composition finds application in gums, confections, oral care products, beverages, snacks, dairy products, soups, sauces, condiments, detergents, fabric softeners and other fabric care products, antiperspirants, deodorants, talc, kitty litter, hair care and styling products, personal care products, air fresheners, cereals, baked goods and cleaners. In specific embodiments, the instant spray-dried flavor composition is used in flavoring chewing gum and beverages. Additionally, the spray-dried powder may be further processed by extrusion, coating, agglomeration, blending, compaction to impart additional functionality or benefits. While the instant invention is described in terms of the spray drying technique, the instant invention can employ other drying technologies or processes wherein the use of low humidity and temperature conditions result in improved product quality through volatile retention.

Other modifications of this invention will be readily apparent to those skilled in the art. Such modifications are understood to be within the scope of this invention. As used herein, all percentages are weight percent unless otherwise noted, L is understood to be liter, kg is understood to be kilogram, and g to be gram. In addition, the amounts, sizes, temperatures and percentages provided herein are understood to include exact numbers and approximations.

The following examples are provided as specific embodiments of the present invention.

EXAMPLE 1

Formulations for Dry Flavor Powders

A comparison between modified formulas and conventional control formulas was conducted. Exemplary Control and Modified formulas of dry flavor powders are listed in Table 2.

TABLE 2

| Component | Control | Modified | Control | Modified |
|---|---|---|---|---|
| Orange Flavor | 20% | 16% | | |
| Berry Flavor | | | 11% | 16% |
| Modified starch | 10% | 8% | 72% | 8% |
| Carbohydrates (e.g., sugar, corn syrup, maltodextrin) | 70% | 76% | 17% | 76% |

Figure 5:
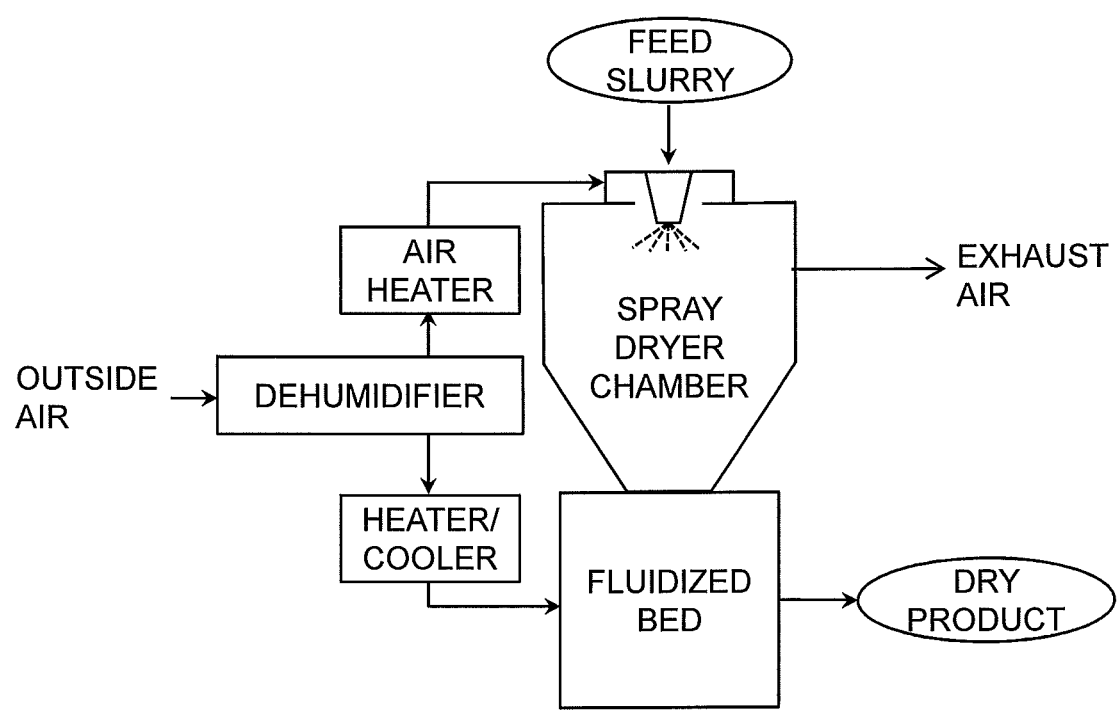
FIG. 5 is a diagram of dryer airflow used in the production of the instant composition.

Control powders were produced by a conventional process conditions and Modified powders were produced by the instant modified process (FIG. 5), according to the conditions listed in Table 3. In both cases, a conventional spray dryer without an integrated fluid-bed was used.

TABLE 3

| Spray Dryer Operating Parameter | Standard | Modified |
|---|---|---|
| Inlet air temperature (° C.) | 170-210 | <100 |
| Inlet air humidity (g H₂O/kg dry air) | 2-18 | 0-4 |
| Outlet air temperature (° C.) | 80-100 | 35-55 |
| Outlet air humidity (g H₂O/kg dry air) | 45-55 | 10-20 |
| Atomizer type | Rotary Disc | Rotary Disc or Nozzle |

All formulations ran well with minimal hold-up, sticking, or other issues in the conventional spray dryer.

EXAMPLE 2

Retention of Volatile Compounds in Modified Orange Flavor Formulation

Figure 2:
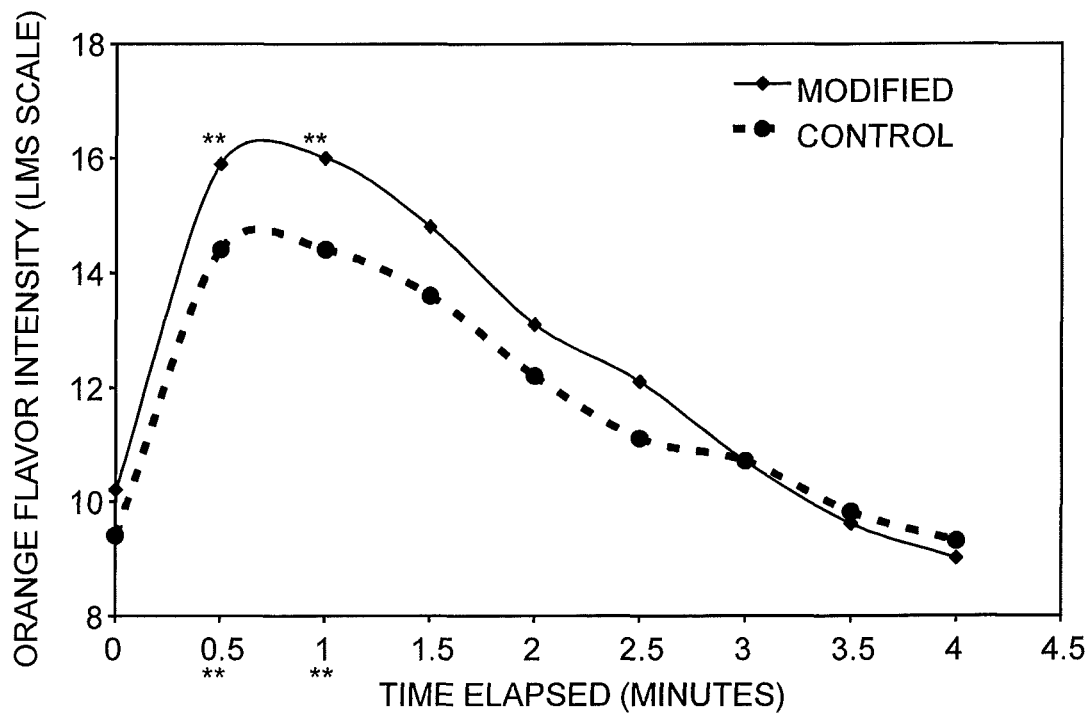
FIG. 2 shows a comparison of time intensity profiles of Orange Flavor between samples produced under different humidity/temperature conditions in sugar-free chewing gum. **Significantly different at p=0.05 at these elapsed times.

Using GC-FID (gas chromatography-flame ionization detector) analysis, the volatile profile of the Orange Flavor formulations in Example 1 was determined. This analysis indicated that the retention of specific volatile materials for the Modified powder compared to the level in the emulsion were approximately 72%, 75%, and 52% for ethyl propionate, ethyl butyrate, and acetaldehyde, respectively. Table 4 indicated the ratio of volatiles retained in the Modified powder in comparison to the Control powder. Sensory tests showed benefit of the Modified powder over the Control powder in a beverage tasting solution (significantly greater overall aroma and orange flavor; FIG. 1) and in chewing gum (significantly greater orange flavor intensity at the 30 and 60 second intervals; FIG. 2).

TABLE 4

| Orange Flavor | Ethyl Propionate | Ethyl Butyrate | Acetaldehyde |
|---|---|---|---|
| Modified | 2.3 | 1.6 | 1.8 |
| Control | 1.0 | 1.0 | 1.0 |

EXAMPLE 3

Retention of Volatile Compounds in Modified Berry Flavor Formulation

Figure 3:
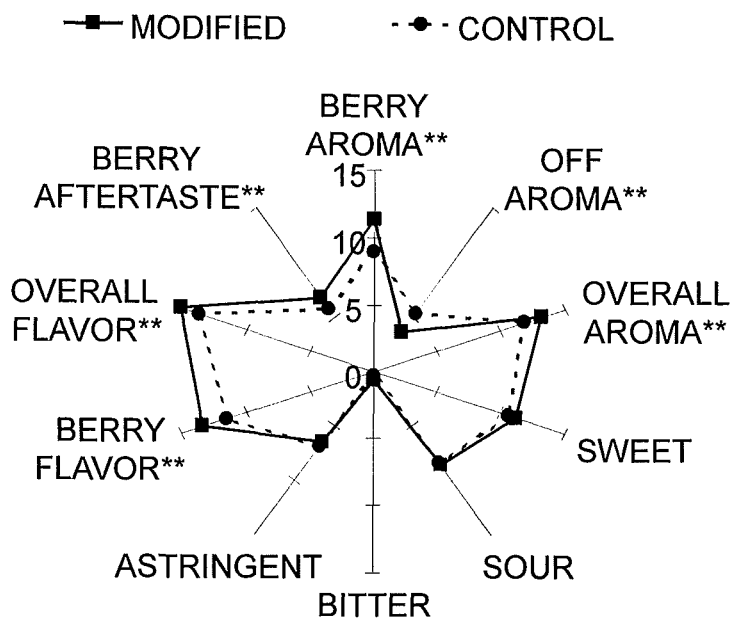
FIG. 3 shows a comparison of sensory profiles of Berry Flavor between samples produced under different humidity/temperature conditions in a beverage tasting solution. **Significantly different at p=0.05.
Figure 4:
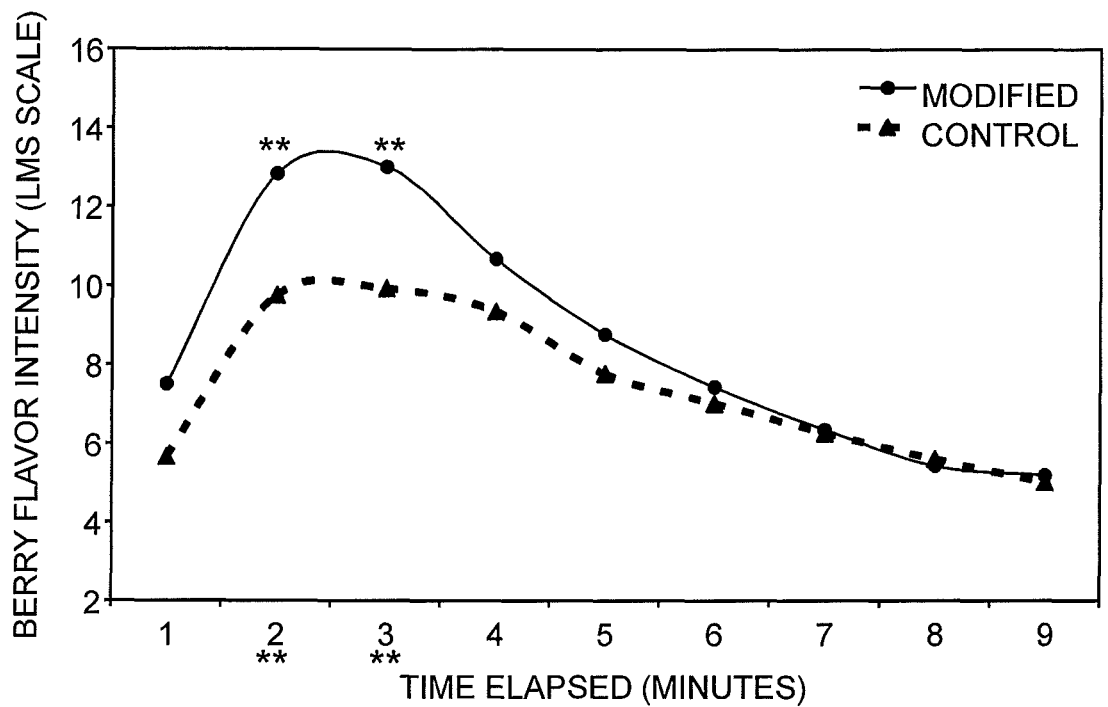
FIG. 4 shows a comparison of time intensity profiles of Berry Flavor between samples produced under different humidity/temperature conditions in sugar-free chewing gum. **Significantly different at p=0.05 at these elapsed times.

Using GC-FID analysis, the volatile profile of the Berry Flavor formulations in Example 1 was determined. This analysis indicated that the retention of specific volatile materials for the Modified powder compared to the level in the emulsion were approximately 24%, 35%, and 87% for dimethyl sulfide, ethyl acetate, and ethyl butyrate, respectively. Table 5 indicated the ratio of volatiles retained in the modified powder in comparison to the Control powder. Sensory tests showed benefit of the Modified powder over the Control powder in a beverage tasting solution (significantly greater berry aroma and flavor, among others; FIG. 3) and in chewing gum (significantly greater berry flavor intensity at the 30 and 60 second intervals; FIG. 4).

TABLE 5

| Berry Flavor | Dimethyl Sulfide | Ethyl Acetate | Ethyl Butyrate |
|---|---|---|---|
| Modified | 12.7 | 13.4 | 4.5 |
| Control | 1.0 | 1.0 | 1.0 |

EXAMPLE 4

Effects of Dryer Process Temperatures

To determine the effect of dryer process temperatures on the physical properties and flavor quality of a citrus flavor, different spray dryer air inlet and outlet temperatures were utilized. The resulting volatile compound content, and flavor strength and aroma as determined by an expert panel are presented in Table 6.

TABLE 6

| Inlet/Outlet Temperature (° C.) | Water activity | Acetaldehyde Content (% of Nominal) | Flavor Strength Ranking | Aroma Strength Ranking |
|---|---|---|---|---|
| 190/90 | 0.16 | 37 | 1 | 1 |
| 93/45 | 0.27 | 42 | 2* | 2* |

*2 = higher.

In addition to the above results, both spray-dried compositions exhibited free-flowing properties after 7 weeks at 40° C. in a closed container. These results indicate that an air inlet temperature below 100° C. reduces loss of volatile flavor compounds, provides improved sensory intensity, while maintaining water activity of the product at a level that prevents caking when exposed to above ambient temperatures.

EXAMPLE 5

Stability of Fruit and Mint Flavors in Chewing Gum

The stability of apple and mint flavors in chewing gum were evaluated. Flavor compositions were spray-dried in accordance with the instant method, incorporated into chewing gum, and the stability of the flavor was evaluated by an expert panel after storage at 32° C. for 2 or 12 weeks or 21° C. for 12 weeks. The results of prototype apple-flavored gum, as compared to a control, are presented in Table 7 and FIG. 6. The control samples were spray dried flavors processed using conventional drying conditions.

TABLE 7

| | Prototype Flavor Stability | | | Control Flavor Stability | | |
|---|---|---|---|---|---|---|
| | 32° C. | | 21° C. | 32° C. | | 21° C. |
| Apple Flavored Gum | 2 weeks | 12 weeks | 12 weeks | 2 weeks | 12 weeks | 12 weeks |
| Candy Banana | 4.5 | 4.5 | 4 | 4 | 2 | 3 |
| Green Apple | 5.5 | 4 | 4.5 | 3 | 2 | 3 |
| Ripe Estery | 6 | 5 | 5.5 | 4 | 3 | 4 |
| Sweet | n.d. | 6 | 6 | n.d. | 5 | 5 |
| Sour | n.d. | 4 | 4 | n.d. | 3 | 3.5 |

TABLE 7-continued

|  | Prototype Flavor Stability | | | Control Flavor Stability | | |
| --- | --- | --- | --- | --- | --- | --- |
|  | 32° C. | | 21° C. | 32° C. | | 21° C. |
| Apple Flavored Gum | 2 weeks | 12 weeks | 12 weeks | 2 weeks | 12 weeks | 12 weeks |
| Salivating | n.d. | 4 | 5 | n.d. | 3 | 4 |
| Astringent | n.d. | 3 | 3 | n.d. | 2.5 | 3 |

Scale: 10-point scale (10 = highest).
Expert panel of four testers.
n.d. = not determined.

The analysis presented in Table 7 indicates that the apple flavor produced by the instant method was as stable as a conventional spray-dried composition at 21° C. (12 weeks) or 32° C. (12 weeks). However, the impact of the apple flavor produced by the instant method was stronger after storage at 32° C. for 12 weeks than that of the conventional spray-dried composition stored at 21° C. for 12 weeks.

The results of prototype mint-flavored gum, as compared to a control, are presented in Table 8.

TABLE 8

|  | Prototype Flavor Stability | | | Control Flavor Stability | | |
| --- | --- | --- | --- | --- | --- | --- |
|  | 32° C. | | 21° C. | 32° C. | | 21° C. |
| Mint Flavored Gum | 2 weeks | 12 weeks | 12 weeks | 2 weeks | 12 weeks | 12 weeks |
| Peppermint | 6 | 4.5 | 5.5 | 4.5 | 3 | 3.5 |
| Menthol | 5.5 | 4.5 | 5.5 | 5.5 | 3 | 3.5 |
| Sweet Creamy | 5 | 4 | 4.5 | 4.5 | 3.5 | 3.5 |
| Sweet | n.d. | 6.5 | 7 | n.d. | 6 | 7 |
| Bitter | n.d. | 1 | 1 | n.d. | 1 | 1 |
| Astringent | n.d. | 1 | 1 | n.d. | 1 | 1 |
| Off-note (plastic) | n.d. | 0 | 0 | n.d. | 1 | 3 |

Scale: 10-point scale (10 = highest).
Four testers.
n.d. = not determined.

The analysis presented in Table 8 indicates that the mint flavor produced by the instant method was as stable as a conventional spray-dried composition at 21° C. (12 weeks) or 32° C. (12 weeks). However, the impact of the mint flavor produced by the instant method was stronger after storage at 32° C. for 12 weeks than that of the conventional spray-dried composition stored at 21° C. for 12 weeks. Overall, the results of this analysis indicated that the desirable sensory attributes of apple and mint flavors were better maintained in chewing gum using the prototype flavor over 12 weeks at 32° C.

EXAMPLE 6

Stability of Raspberry Flavor in Powdered Soft Drink Mix

The stability of raspberry flavor in powdered soft drink mix was evaluated. A raspberry flavor composition was spray-dried in accordance with the instant method, incorporated into a powdered soft drink mix, and the stability of the flavor was evaluated by an expert panel after storage for 8 weeks at 38° C. The results of the prototype soft drink mix containing the instant spray-dried flavor composition, as compared to a control, are presented in Table 9. The control sample was a spray dry flavor processed using conventional drying conditions.

TABLE 9

| Sample | Degree of Difference* | Description |
| --- | --- | --- |
| Prototype | 9 | No off-notes present. Flavor attributes similar to refrigerated reference. |
| Control | 7 | Lacking fullness, sweetness, loss of impact and juiciness compared to refrigerated reference. |

*Scale: 1-3: very large difference, off-notes present; 10: not different from refrigerated reference.

This analysis indicated that after 8 weeks of accelerated storage, the raspberry prototype maintained flavor quality.

EXAMPLE 7

Evaluation of Savory Broths

Spray-dried flavor compositions, prepared in accordance with the instant method, were incorporated into savory broths and attributes of the broths were assessed by a panel of consumers. The attributes of the prototype broths, as compared to a control, are presented in Table 10. The control broths were prepared from spray dry flavors processed using conventional drying conditions.

TABLE 10

| Flavor Type | % Preference for Prototype* | Attributes** Prototype vs. Control |
| --- | --- | --- |
| Chicken | 77 (N = 65, p = 0.0001) | More white meat flavor, fresher, more balanced, rounder flavor, more overall aroma |
| Beef | 59 (N = 63, p = 0.17) | More overall aroma, more roasted flavor, bolder flavor, more memorable |

*Paired comparison forced choice preference test among category users.
**Significantly different at greater than or equal to 90% confidence interval.

Consumer data showed statistically significant preference for the prototype flavors. This is further supported by the attributes selected by consumers to describe the flavor quality of the prototypes.

EXAMPLE 8

Sensory Stability of Neat Powders in High Barrier Packaging

The stability of various flavor prototypes in high barrier packaging (FRESHTEK) was assessed after storage for 6, 12, or 18 weeks at 40° C. The attributes of the prototype powders are presented in Table 11.

TABLE 11

|  | Description* | | |
| --- | --- | --- | --- |
| Prototype | 6 weeks | 12 weeks | 18 weeks |
| Peach 11-71 | Acceptable | Acceptable | Acceptable |
| Apple 11-58 | Acceptable | Acceptable Slight off-notes | Borderline Slight off-notes, noticeably weaker than reference |

TABLE 11-continued

| Prototype | Description* | | |
|---|---|---|---|
| | 6 weeks | 12 weeks | 18 weeks |
| Orange Valencia 11-299 | Acceptable | Acceptable No oxidized notes | Acceptable No oxidized notes |
| Lime 11-331 | Acceptable | Acceptable No oxidized notes, slightly weaker than reference | Borderline No oxidized notes, noticeably weaker than reference |
| Lemon Brazilian 11-315 | Acceptable | Acceptable No oxidized notes | Acceptable No oxidized notes |

*Expert panel evaluation, reference sample was kept frozen during storage study.

What is claimed is:

1. A method for producing a spray-dried flavor composition capable of retaining volatile compounds comprising spray drying a flavor containing volatile compounds in a spray dryer, the spray dryer having an inlet temperature of less than 100° C. and an inlet air humidity of 0—4 g $H_2O$/kg dry air and having an outlet temperature between 35° C. and 55° C. and an outlet air humidity of 10—20 g $H_2O$/kg dry air to obtain a spray-dried flavor composition, wherein the volatile compounds are present in the spray-dried flavor composition in an amount that is at least 20% of the volatile compounds originally contained in the flavor, and the spray-dried flavor composition has a stronger flavor than a control flavor after storage for at least 12 weeks at a temperature of at least 32° C.

2. The method of claim 1, further comprising drying the spray-dried flavor composition in a fluid-bed chamber attached at the spray dryer outlet, wherein the temperature of the air of the fluid-bed unit is at or below the outlet temperature of the spray dryer.

3. The method of claim 1, wherein the volatile compounds are acetaldehydes, dimethyl sulfides, ethyl acetates, ethyl propionates, methyl butyrates, or ethyl butyrates.

4. The method of claim 1, wherein the volatile compounds have a boiling point of less than 200° C.

5. The method of claim 1, wherein the flavor emulsion further comprises a carrier material.

6. The method of claim 1, wherein the flavor further comprises a solvent.

7. The method of claim 6, wherein the solvent is a volatile solvent.

8. The method of claim 5, wherein the flavor and carrier material comprise 40% and 70% as dry solid material of the total composition.

9. The method of claim 1, wherein air of the spray dryer is partially or wholly nitrogen or carbon dioxide.

10. The method of claim 1, wherein the water activity of the composition is in the range of 0.1 to 0.6.

11. A spray-dried flavor composition produced by the method of claim 1, wherein the water activity of the composition is in the range of 0.1 to 0.6.

12. The spray-dried flavor composition of claim 11, wherein the spray-dried flavor composition is incorporated into gums, confections, oral care products, beverages, snacks, dairy products, soups, sauces, condiments, detergents, fabric softeners and other fabric care products, antiperspirants, deodorants, talc, kitty litter, hair care and styling products, personal care products, air fresheners, cereals, baked goods or cleaners.

13. The spray-dried flavor composition of claim 11, wherein the spray-dried flavor composition is incorporated into a chewing gum or beverage.

* * * * *